Jan. 15, 1935.　　　　　C. B. HORSLEY　　　　　1,988,008
CIRCUIT CONTROL MEANS
Filed April 19, 1933　　　5 Sheets-Sheet 1

INVENTOR
Caperton B. Horsley
BY
Brockett, Hyde, Higley & Meyer
ATTORNEYS

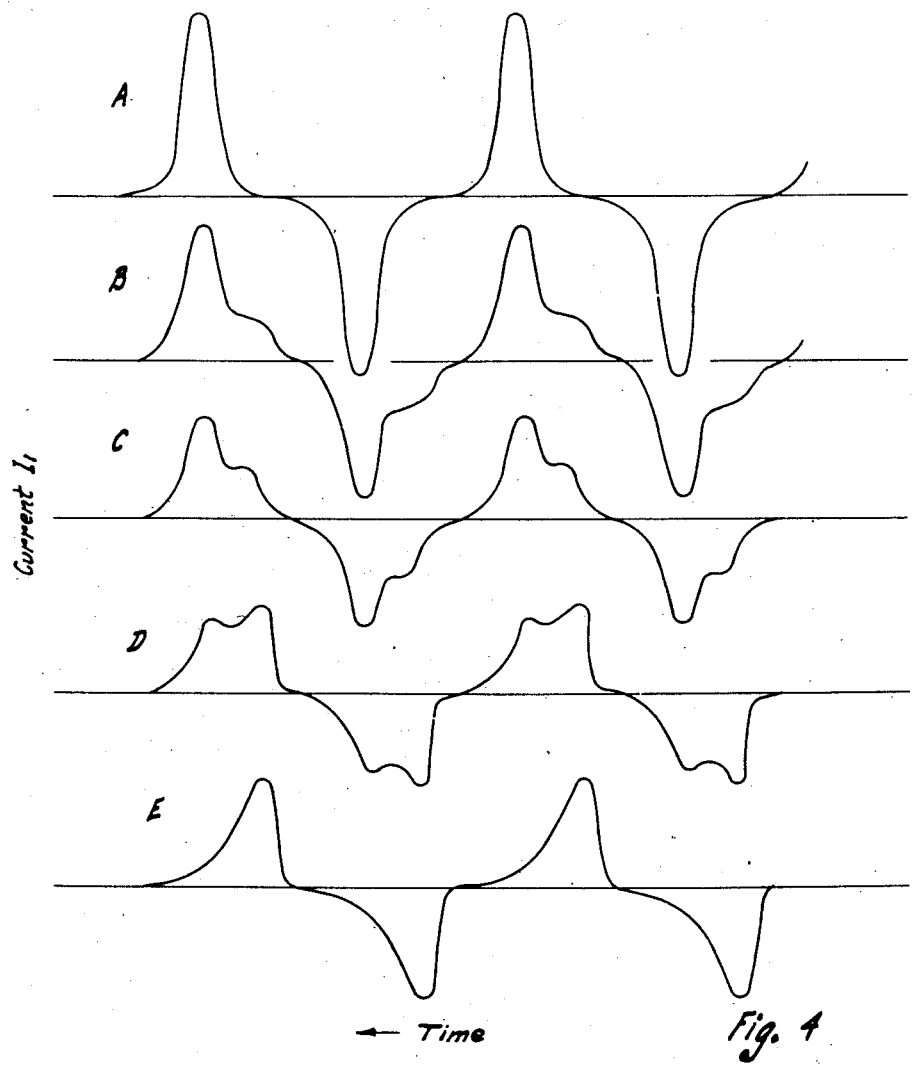
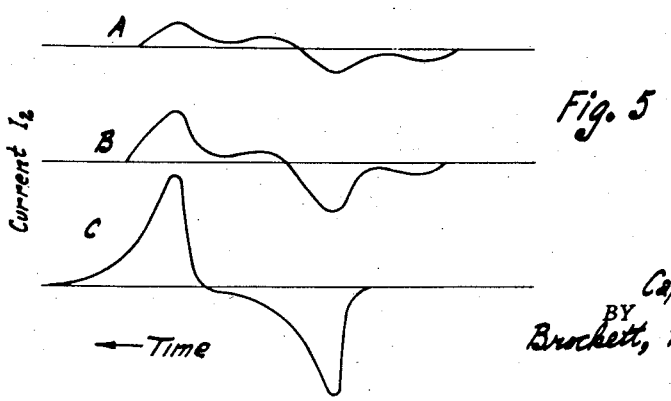
Fig. 4
Fig. 5

Jan. 15, 1935.   C. B. HORSLEY   1,988,008
CIRCUIT CONTROL MEANS
Filed April 19, 1933   5 Sheets-Sheet 3

INVENTOR
Caperton B. Horsley
BY
Brockett, Hyde, Higley & Meyer
ATTORNEYS

Jan. 15, 1935. C. B. HORSLEY 1,988,008
CIRCUIT CONTROL MEANS
Filed April 19, 1933 5 Sheets-Sheet 5

INVENTOR
Caperton B. Horsley
BY
Brockett, Hyde, Higley & Meyer
ATTORNEYS

Patented Jan. 15, 1935

1,988,008

UNITED STATES PATENT OFFICE 1,988,008

CIRCUIT CONTROL MEANS

Caperton B. Horsley, East Cleveland, Ohio, assignor of one-half to Edwin R. Goldfield, Cleveland Heights, Ohio Application April 19, 1933, Serial No. 666,920

6 Claims. (Cl. 171—119)

This invention relates to means for automatically modifying the funtional relation of the load resistance or amperage to the applied voltage, in an alternating current circuit. The invention takes advantage of the magnetic saturation characteristic of iron cored reactors, and its objects are to utilize such characteristics to effect the described functional modification, according to the control characteristics desired. Thus the applied load voltage may be stabilized or maintained substantially constant through a wide variation in load resistance or in line voltage; or the load voltage may be made to increase as the load current increases, the load voltage still being substantially independent of line voltage variations.

Figure 1:
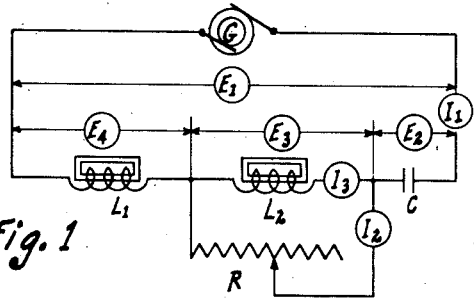
Figure 3:
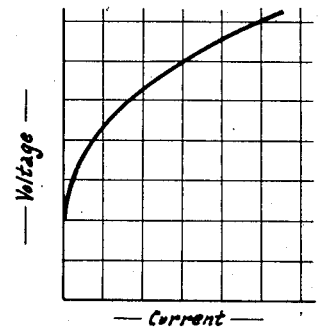
Figure 2:
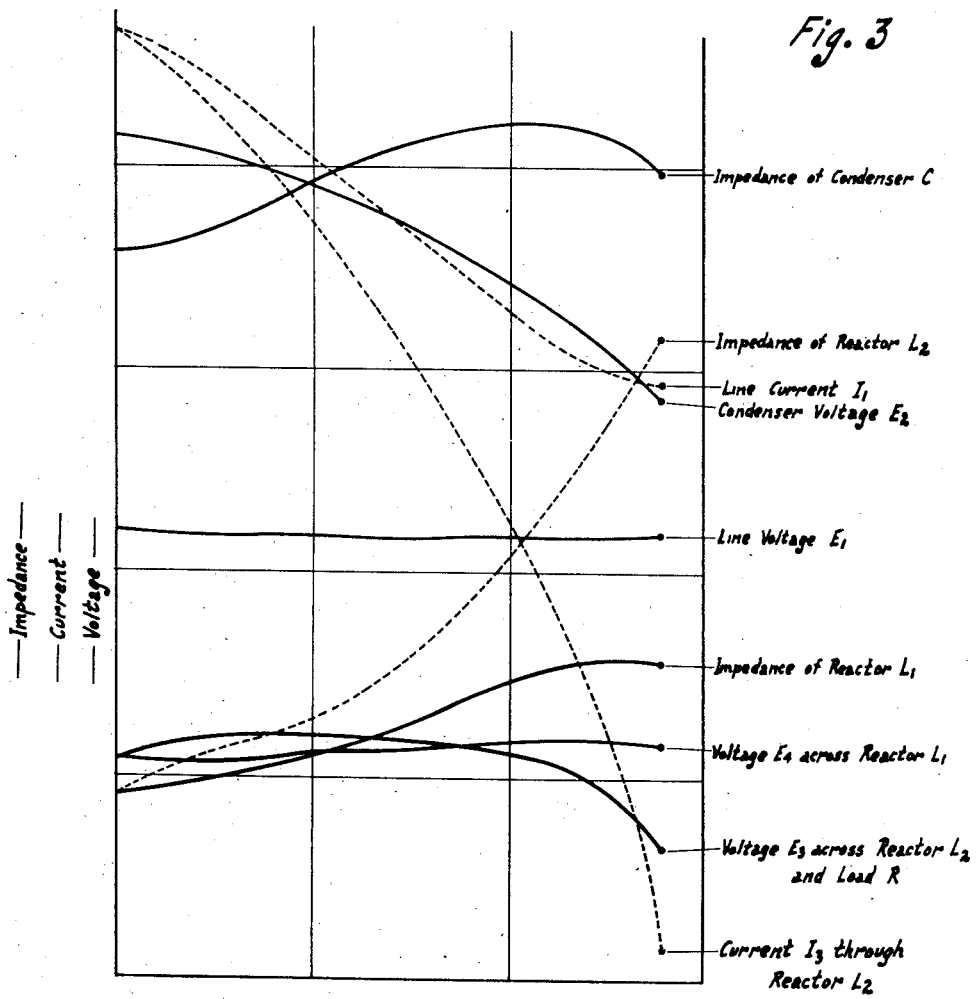
Figure 6:
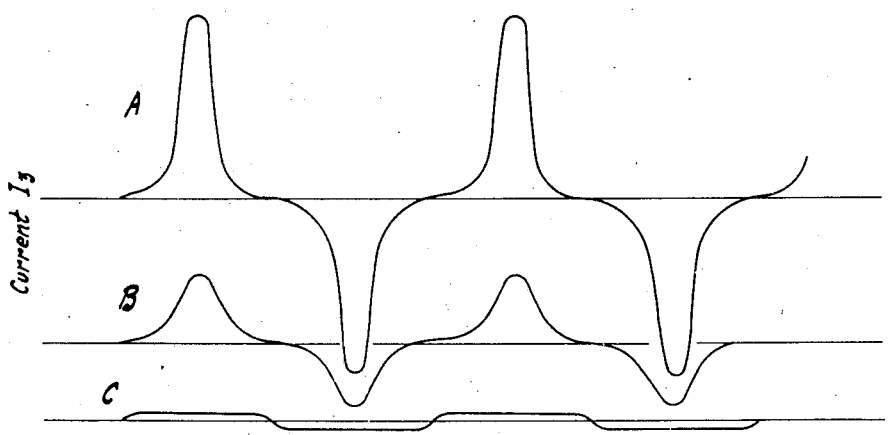
Figure 7:
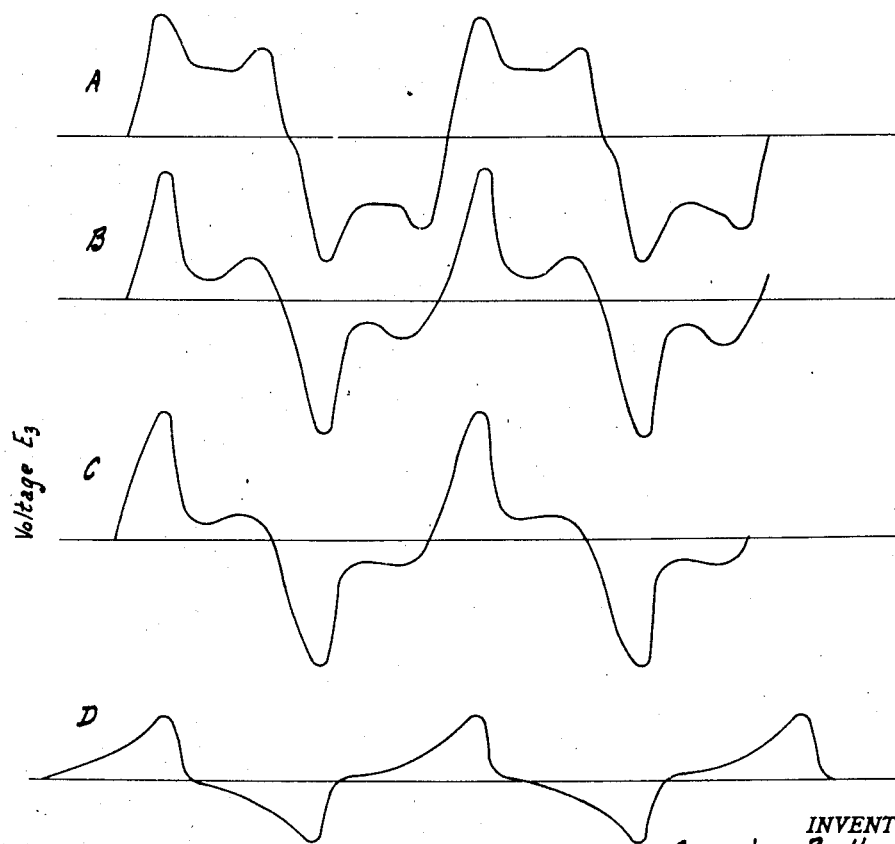
Figure 8:
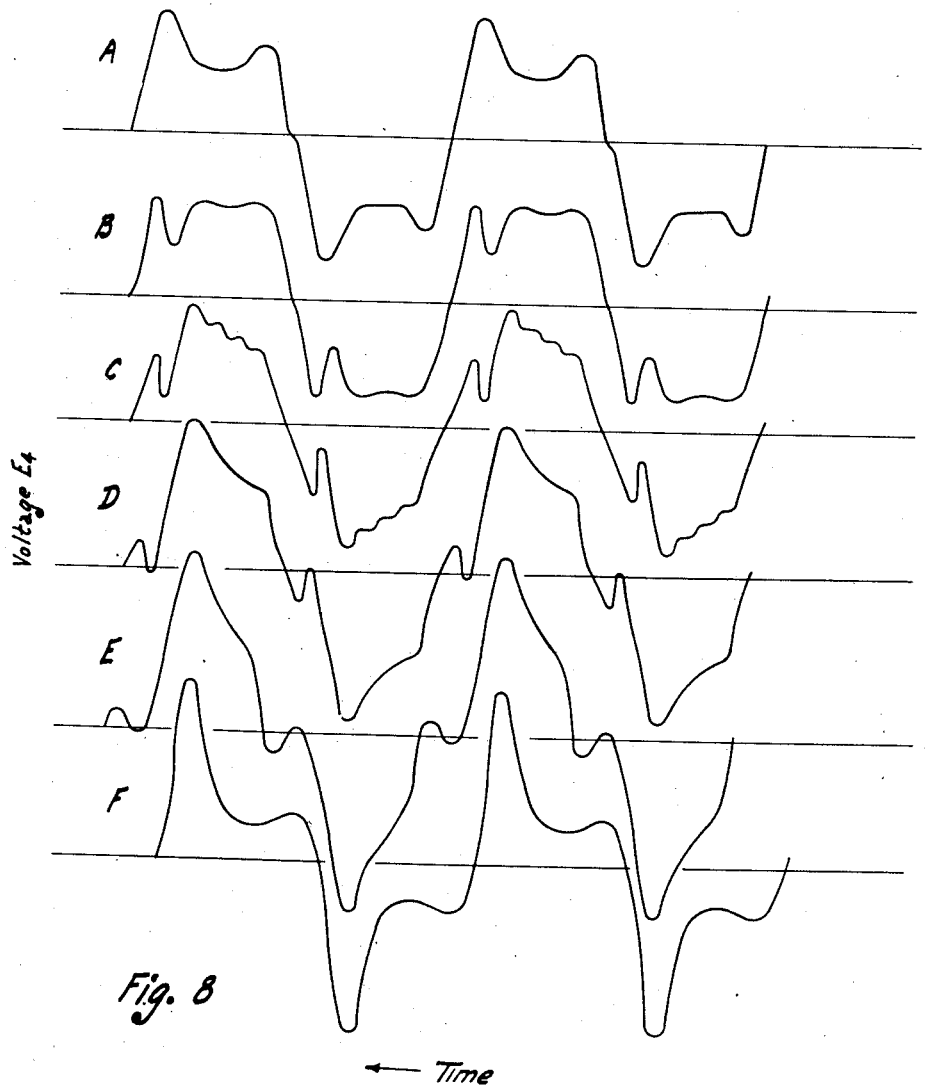
Figure 9:
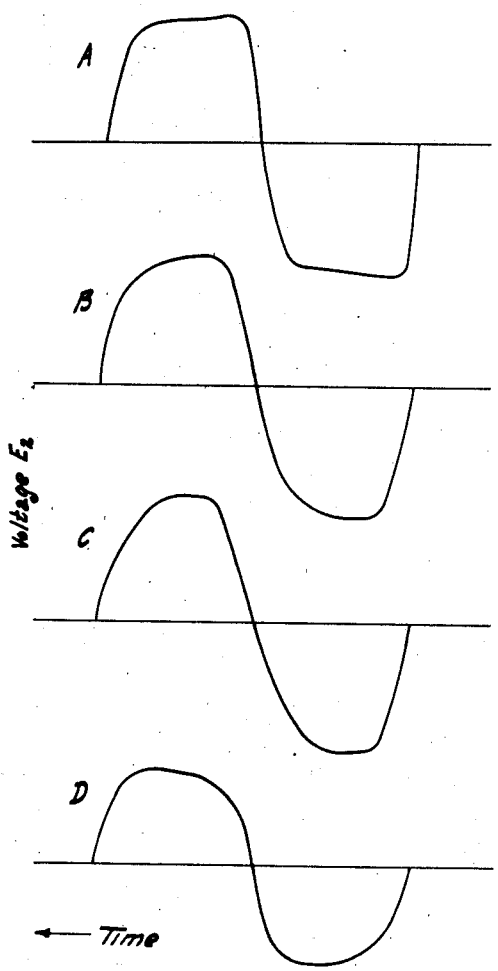
Figure 10:
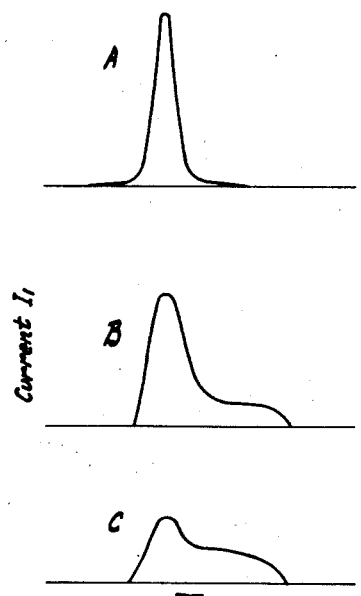
Figure 11:
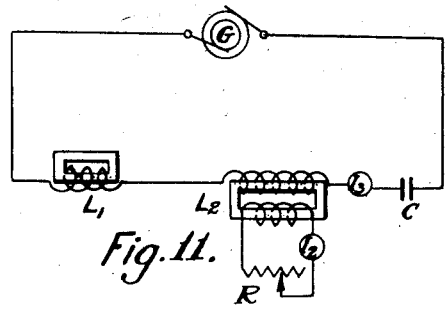

The exact nature of this invention, together with further objects and advantages thereof, will be apparent from the following description taken in connection with the accompanying drawings, in which Fig. 1 conventionally indicates an elementary circuit illustrative of the invention, and the remaining figures graphically illustrate performance characteristics of the same circuit and its various parts. More particularly Fig. 2 is a composite graph of the performance of the elementary circuit; Fig. 3 represents the magnetic saturation characteristic of the iron cored reactor employed in the circuit; Fig. 4 is a series of line current wave forms under various conditions; Fig. 5 is a series of load current wave forms under various conditions; Fig. 6 is a series of wave forms of current through the reactor that is parallel to the load; Fig. 7 is a series of wave forms of the voltage across this reactor; Fig. 8 is a series of wave forms of voltage across the other reactor under various conditions; Fig. 9 is a series of wave forms of the voltage across the condenser under various conditions; Fig. 10 is a series of line current wave forms under various conditions obtained when only the one reactor is used in series with the condenser; and Fig. 11 shows a modification of the elementary circuit of Fig. 1.

With reference now to the drawings and first to Fig. 1 thereof, the elementary circuit comprises a variable load, conventionally indicated by the resistance R, a pair of iron cored reactors $L_1$ and $L_2$, a capacity C, and an alternating current generator G. For simplicity of illustration the reactors have been chosen with similar characteristics. Fig. 3 shows the voltage-current curve of each of these reactors, indicating the non-linear characteristic of the inductive reactance due to the magnetic saturation of the iron core. This curve indicates the characteristic obtained with a voltage of sine wave form applied to the terminals of the reactor. As indicated in Fig. 1, the inductances $L_1$, $L_2$, and the capacity C are in series relation with each other, and across the line from the generator G; and the load R is in parallel relation with the inductance $L_2$.

$E_1$, $E_2$, $E_3$ and $E_4$ represent, respectively, the output voltage of generator G, and the voltage drop across condenser C, reactor $L_2$ and load R, and reactor $L_1$. $I_1$ and $I_3$ represent, respectively, the total current supplied by the generator, and the current through reactor $L_2$. In Fig. 2, these voltage and current values are plotted against $I_2$, the current through load R. Curves representing impedances of condenser C, reactor $L_1$ and reactor $L_2$, plotted against load current $I_2$ are also shown in Fig. 2.

In operation, as the current through load R is increased, as by decreasing its resistance, the wave form of the current $I_1$, changes as is indicated in the series of wave forms shown in Fig. 4, due to the increase of the resistance component. The first curve A, Fig. 4, indicates the wave form at no load, this being a characteristic wave form in a circuit having a saturated iron cored reactor in series with a condenser of such value that the voltage drop across the condenser is considerably greater than the voltage drop across the reactor, when a sine wave form of voltage is applied. Consideration of the remaining series of curves, Fig. 4, will show that, as the load is successively increased, that is, the resistance of load R decreased, the wave form is correspondingly changed so that the ratio between the peak and the root mean square values becomes less. Accordingly, it may be seen that the degree of saturation of the iron core of the reactor through which this current passes will become less, even though the root mean square current value through this reactor remains constant. Thus the impedance of the reactor may be greater for a wave form such as indicated at D, than for a wave form such as indicated at A, even though the root mean square current value remain the same, and in spite of the fact that the effective frequency due to the higher harmonics included in wave form A is greater than the effective frequency of wave form D. In wave form E the circuit is overloaded and the peak to root mean square ratio has started to increase.

With reference to Fig. 2 it is seen that as the load current is increased the impedance of condenser C is increased, due to the lower effective frequency of the wave form of the current through it, which is caused by the increase of the resistance component due to the increase in the load current. However, it may be seen that although the effective frequency is thus decreased, the impedance of reactor L₁ is increased, due to the lower peak to root mean square ratio of the wave form, as described above. It may also be noted that the impedance of the reactor L₂ increases to an even greater extent, due to the fact that besides the peak to root mean square ratio of the current through it decreasing, as is shown by an examination of Fig. 6, the increasing load bypasses an increasing amount of current, thus further decreasing the average degree of saturation of its core.

Fig. 5 indicates the wave form of the current through the load R at various load resistances.

Referring again to Fig. 2, it will be seen that as the load current I₂ increases the load voltage E₃ also increases up to a certain point, beyond which the load voltage then decreases slightly. As soon as this voltage passes below its initial no load value it decreases rapidly, thus giving a desirable low short circuit current value.

Fig. 7 indicates the change in the wave form of the voltage across reactor L₂ as the load is increased. In Figs. 4 to 10, inclusive, the wave forms indicated at A are obtained when the load current is zero, the subsequent wave forms being obtained at increasingly greater load current values.

Fig. 8 indicates the change in the voltage wave form across L₁ as the load is increased.

Fig. 9 indicates the change in the voltage wave form across condenser C as the load is increased. It will be observed that line voltage stabilization is also obtained in this circuit due to the fact that the core of reactor L₂ is operated well above the knee of its magnetizing curve. For, though line voltage changes will make approximately proportional current changes through this circuit, the voltage changes across L₂ will be very small for comparatively great current changes through it, due to the saturation of its core.

Fig. 10 indicates the change in the wave form of current I₁, that would be obtained were but one reactor used in this circuit, instead of two independent reactors with the load parallel to only one. It will be noted that whereas the peak to root mean square ratio of the current wave form decreases, the value of the current decreases much more decidedly than is shown in Fig. 4. This is due to the fact that a resistance so connected must constitute a greater total impedance factor in the circuit than is the case in the circuit of Fig. 1, where two independent reactors are used. Thus changes in load resistance of sufficient magnitude to appreciably affect the current wave form or the saturation of the core must decrease the degree of resonance of the circuit much more than is the case in the circuit of Fig. 1, thereby increasing the total impedance of the circuit, and consequently decreasing the voltage across the inductance more than this voltage is increased due to the current wave form change and the lesser saturation of the core. It will be appreciated that the load may be tapped off, or even magnetically coupled to its reactor L₂, as illustrated in Fig. 11, instead of directly connected in the parallel relation indicated in Fig. 1.

It is apparent that for the greatest increase in load voltage for a given increase in load current, a suitable ratio of the impedance of L₁ and L₂ must be obtained. Thus, if the impedance of L₁ is too small, the effect described above takes place; whereas if the impedance of L₂ is too small, changes in the load value will not appreciably affect the total current wave form, and the voltage compensating effect for load changes will accordingly not be apparent.

What I claim is:

1. A circuit for the purpose described, comprising a capacity element and a plurality of saturable inductance elements, said elements being arranged between a load and its current supply line, in series relation with each other across the line, one of said inductance elements being magnetically coupled to said load.

2. A circuit for the purpose described, comprising a capacity element and a plurality of saturable inductance elements, said elements being arranged between a load and its current supply line, in series relation with each other across the line, one of said inductance elements being in parallel relation with said load.

3. In a circuit of the class described, comprising a capacity element and a plurality of cored inductance elements, said elements being arranged between a load and its current supply line, in series relation with each other across the line, one of said inductance elements being in magnetically coupled relation with said load, said elements being so proportioned, and said inductance elements having such magnetic saturation characteristics, that the load voltage will be substantially constant for a wide range of load current.

4. In a circuit of the class described, comprising a capacity element and a plurality of cored inductance elements, said elements being arranged between a load and its current supply line, in series relation with each other across the line, one of said inductance elements being in parallel relation with said load, said elements being so proportioned, and said inductance elements having such magnetic saturation characteristics, that the load voltage will increase as the load current increases.

5. In a circuit of the class described, comprising a capacity element and a plurality of cored inductance elements, said elements being arranged between a load and its current supply line, in series relation with each other across the line, one of said inductance elements being in magnetically coupled relation with said load, said elements being so proportioned, and said inductance elements having such magnetic saturation characteristics, that the load voltage will be substantially constant for a wide range of load current and also be substantially constant for a wide variation in applied line voltage.

6. In a circuit of the class described, comprising a capacity element and a plurality of cored inductance elements, said elements being arranged between a load and its current supply line, in series relation with each other across the line, one of said inductance elements being in parallel relation with said load, said elements being so proportioned, and said inductance elements having such magnetic saturation characteristics, that the load voltage will increase as the load current increases and will also be substantially independent of applied line voltage.

CAPERTON B. HORSLEY.